United States Patent
Hamasaki et al.

(10) Patent No.: US 10,443,455 B2
(45) Date of Patent: Oct. 15, 2019

(54) VARIABLE VALVE TIMING CONTROL DEVICE

(71) Applicant: AISIN SEIKI KABUSHIKI KAISHA, Kariya-shi, Aichi-ken (JP)

(72) Inventors: Hiroyuki Hamasaki, Obu (JP); Yuji Noguchi, Obu (JP); Takeo Asahi, Kariya (JP); Tomohiro Kajita, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/848,903

(22) Filed: Dec. 20, 2017

(65) Prior Publication Data
US 2018/0245488 A1    Aug. 30, 2018

(30) Foreign Application Priority Data

Feb. 24, 2017    (JP) .................................. 2017-033840

(51) Int. Cl.
*F01L 1/34*    (2006.01)
*F01L 1/344*    (2006.01)
(Continued)

(52) U.S. Cl.
CPC ............. *F01L 1/3442* (2013.01); *F01L 1/022* (2013.01); *F15B 13/0402* (2013.01);
(Continued)

(58) Field of Classification Search
CPC . F01L 1/3442; F01L 1/022; F01L 2001/3443; F01L 2001/34483;
(Continued)

(56) References Cited

U.S. PATENT DOCUMENTS

| 7,389,756 B2 | 6/2008 | Hoppe et al. |
| 2007/0095315 A1 | 5/2007 | Hoppe et al. |

(Continued)

FOREIGN PATENT DOCUMENTS

| CN | 105781653 A | 7/2016 |
| JP | 2009-515090 A | 4/2009 |

OTHER PUBLICATIONS

Extended European Search Report dated Jul. 12, 2018 issued by the European Patent Office in corresponding European Patent Application No. 17210792.2 (6 pages).

*Primary Examiner* — Zelalem Eshete
(74) *Attorney, Agent, or Firm* — Buchanan Ingersoll & Rooney PC

(57) ABSTRACT

A variable valve timing control device includes a drive-side rotational body, a driven-side rotational body, a connecting bolt coaxially disposed with a rotary axis and connecting the driven-side rotational body to a camshaft, the connecting bolt formed with an advanced-angle port and a retarded-angle port from an outer circumferential surface of the connecting bolt through an inner space, a valve unit disposed at the inner space of the connecting bolt, and a check valve provided at an upstream in a supplying direction of fluid relative to the valve unit. The check valve includes a seat member formed with at least one circulation port at a position being away from the rotary axis; and a valve body configured to close the circulation port at a downstream in the supplying direction of the fluid relative to the seat member, the valve body including an opening portion about the rotary axis.

9 Claims, 9 Drawing Sheets

(51) Int. Cl.
  *F01L 1/02* (2006.01)
  *F15B 13/04* (2006.01)
  *F15B 13/044* (2006.01)
  *F15B 21/041* (2019.01)
  *F16K 15/18* (2006.01)

(52) U.S. Cl.
  CPC ........ *F15B 13/0442* (2013.01); *F15B 21/041* (2013.01); *F16K 15/183* (2013.01); *F01L 2001/3443* (2013.01); *F01L 2001/3444* (2013.01); *F01L 2001/34423* (2013.01); *F01L 2001/34426* (2013.01); *F01L 2001/34483* (2013.01)

(58) Field of Classification Search
  CPC ..... F01L 2001/3444; F01L 2001/34426; F01L 2001/34423; F16K 15/183; F15B 21/041; F15B 13/0402; F15B 13/0442
  See application file for complete search history.

(56) References Cited

U.S. PATENT DOCUMENTS

| | | |
|---|---|---|
| 2010/0288384 A1 | 11/2010 | Hoppe et al. |
| 2013/0118622 A1 | 5/2013 | Patzold et al. |
| 2015/0240673 A1 | 8/2015 | Gruber et al. |
| 2015/0300212 A1 | 10/2015 | Bayrakdar |

VARIABLE VALVE TIMING CONTROL DEVICE

CROSS REFERENCE TO RELATED APPLICATIONS

This application is based on and claims priority under 35 U.S.C. § 119 to Japanese Patent Application 2017-033840, filed on Feb. 24, 2017, the entire content of which is incorporated herein by reference.

TECHNICAL FIELD

This disclosure generally relates to a variable valve timing control device.

BACKGROUND DISCUSSION

A known variable valve timing control device performing adjustable setting of a gas exchanging valve is disclosed in Japanese Unexamined Patent Application Publication 2009-515090 (hereinafter referred to as Patent reference 1). The variable valve timing control device disclosed in Patent reference 1 discloses a technology including a control valve inside a center screw that is connected to a camshaft, the technology including a check valve at a passage supplying hydraulic liquid (fluid) to the control valve.

In Patent reference 1, the check valve includes a closing body (a ball) that is biased in a closing direction by a spring element.

A technology in which a control piston is contained in a housing and in which a check valve preventing a backflow of an operating oil at a passage supplying the operating oil to the control piston is provided is disclosed in US2013-0118622A (hereinafter referred to as Patent reference 2).

In Patent reference 2, the check valve includes a plate having an opening, and a valve body supported by a plate-shaped elastic body so as to be able to close the opening.

A technology including a check valve having the same configuration as that of Patent reference 2 and a relief valve that are disposed in parallel to each other is disclosed in US2015-0300212A (hereinafter referred to as Patent reference 3).

Like an inside of a connecting bolt of the variable valve timing control device, in a case where the variable valve timing control device includes a valve unit that is coaxially disposed with a rotary axis, the distance between, one of an advanced-angle chamber and a retarded-angle chamber that are formed between a drive-side rotational body and a driven-side rotational body, and the valve unit may be reduced, and therefore, the responsiveness of the operation may be enhanced while reducing the pressure loss of a flow passage.

Furthermore, in the configuration in which the valve unit is coaxially disposed with the rotary axis, it is rational that a check valve is provided in the valve unit as disclosed in Patent references 1 to 3.

However, in the variable valve timing control device including the ball serving as the check valve disposed in Patent reference 1, the space for containing the ball and moving the ball in a release position is required, and therefore, the variable valve timing control device may be upsized. Furthermore, in the check valve having this configuration, because the ball is disposed at a center position of the flow passage, the pressure loss may occur by the contact of the fluid to the ball in a state where the check valve is open.

On the other hand, as disclosed in Patent references 2 and 3, the check valve including the plate being formed with the opening and the valve body closing the opening may be downsized. However, because the check valve is disposed at a position displaced from the rotary axis, fluid flowing in a passage in a state where the check valve is open may be easily in contact with a flow passage inner wall, and therefore, the pressure loss may occur.

A need thus exists for a variable valve timing control device which is not susceptible to the drawback mentioned above.

SUMMARY

According to an aspect of this disclosure, a variable valve timing control device includes a drive-side rotational body rotating synchronously with a crankshaft of an internal combustion engine, a driven-side rotational body being coaxially disposed with a rotary axis of the drive-side rotational body and rotating integrally with a camshaft for opening and closing a valve, a connecting bolt being coaxially disposed with the rotary axis and connecting the driven-side rotational body to the camshaft, the connecting bolt being formed with an advanced-angle port and a retarded-angle port from an outer circumferential surface of the connecting bolt through an inner space, the advanced-angle port and the retarded-angle port communicating with an advanced-angle chamber and a retarded-angle chamber, respectively, that are disposed between the drive-side rotational body and the driven-side rotational body, a valve unit being disposed at the inner space of the connecting bolt, and a check valve being provided at an upstream in a supplying direction of fluid relative to the valve unit. The check valve includes a seat member being formed with at least one circulation port at a position being away from the rotary axis, and a valve body being configured to close the circulation port at a downstream in the supplying direction of the fluid relative to the seat member, the valve body including an opening portion about the rotary axis.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the disclosure will be explained with reference to the drawings.

Figure 1:
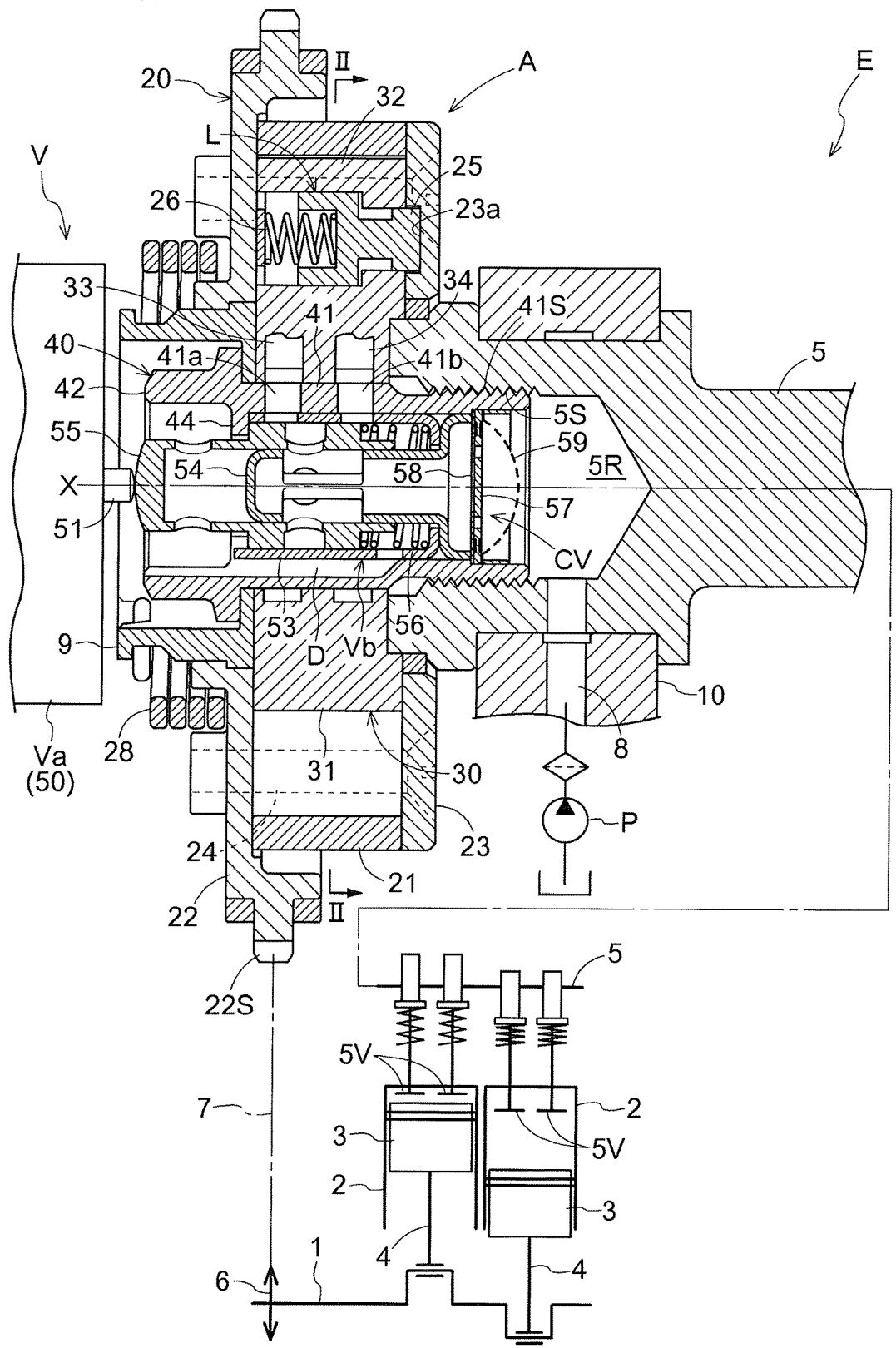
FIG. 1 is a cross sectional view illustrating an entire configuration of a variable valve timing control device according to a first embodiment disclosed here.
Figure 2:
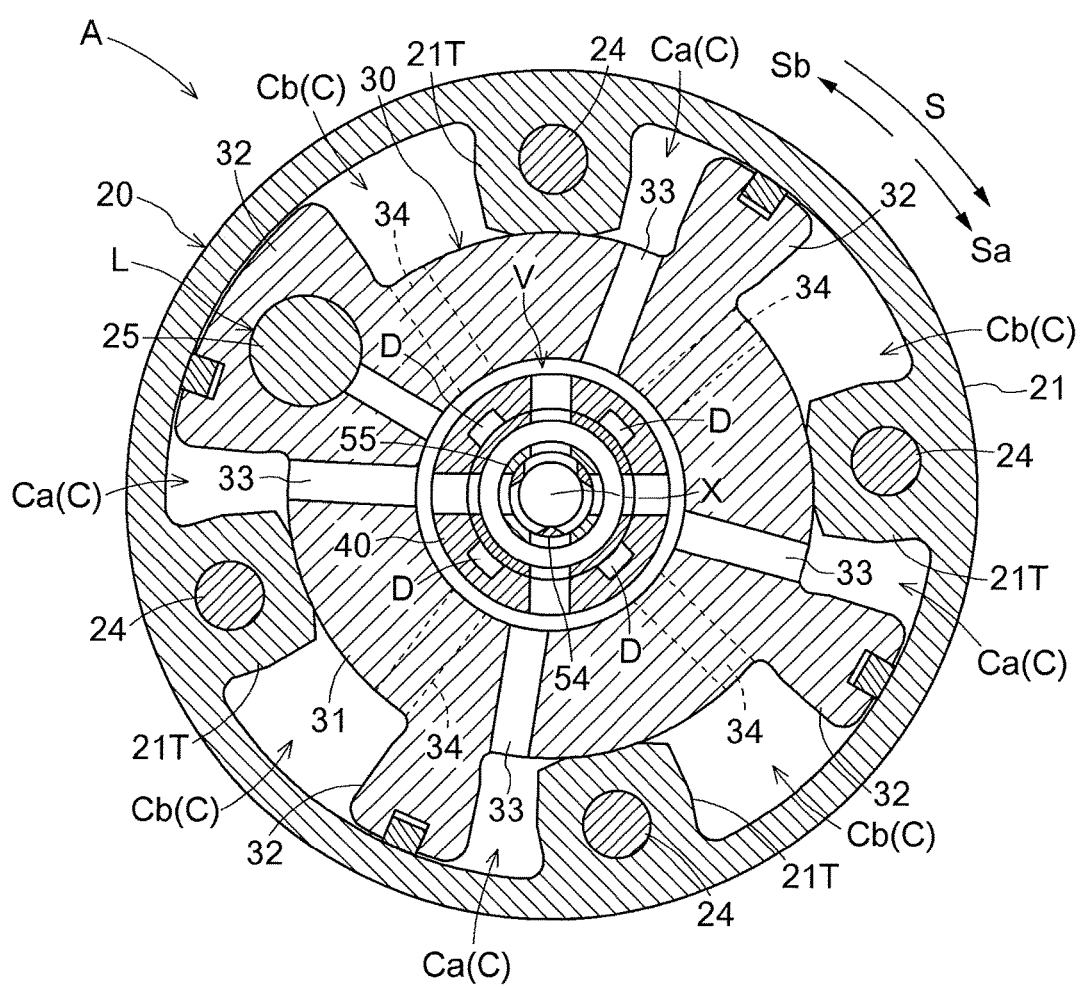
FIG. 2 is a cross sectional view taken along line II-II in FIG. 1.
Figure 3:
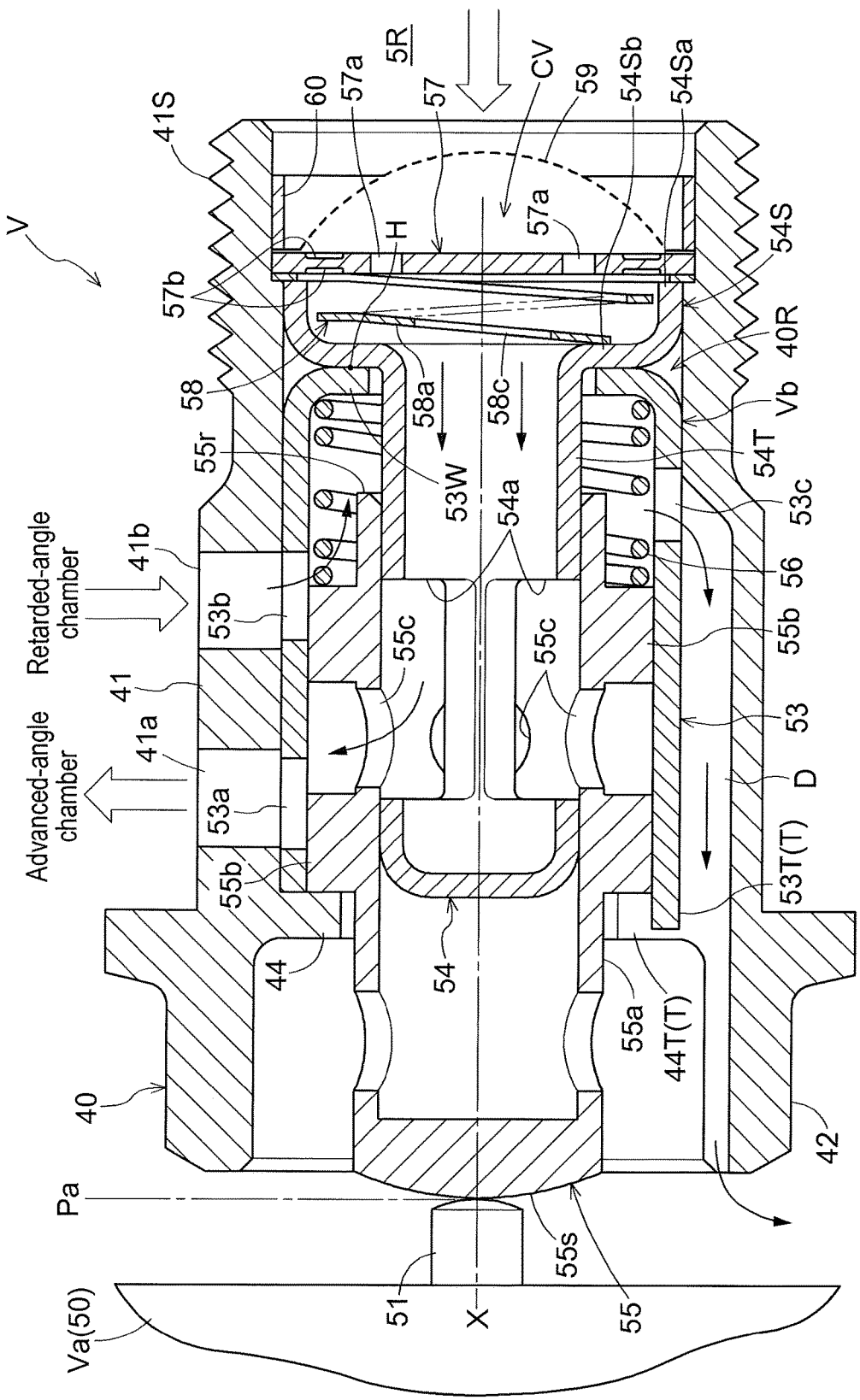
FIG. 3 is a cross sectional view of a valve unit in which a spool is disposed in an advanced-angle position.

A basic configuration of a first embodiment will hereunder be explained. As illustrated in FIGS. 1 to 3, a variable valve timing control device A includes an outer rotor 20 serving as a drive-side rotational body, an inner rotor 30 serving as a driven-side rotational body, and an electromagnetic control valve V controlling operating oil serving as fluid.

The inner rotor 30 (an example of the driven-side rotational body) is coaxially disposed with a rotary axis X of an intake camshaft 5, and is connected thereto by a connecting bolt 40 so as to integrally rotate therewith. The outer rotor 20 (an example of the drive-side rotational body) is coaxially disposed with the rotary axis X and synchronously rotates with a crankshaft 1 of an engine E serving as an internal combustion engine. The outer rotor 20 contains the inner rotor 30, and is supported therewith so as to be relatively rotatable therewith.

The electromagnetic control valve V includes an electromagnetic unit Va supported by the engine E, and a valve unit Vb that is contained in an inner space 40R of the connecting bolt 40.

The electromagnetic unit Va includes a solenoid portion 50, and a plunger 51 that is coaxially disposed with the rotary axis X so as to extend and retract by the drive control of the solenoid portion 50. The valve unit Vb includes a spool 55 that controls the supply and discharge of the operating oil (an example of fluid) and that is coaxially disposed with the rotary axis X.

The protruding amount of the plunger 51 is set by the control of electricity supplied to the solenoid portion 50, and the spool 55 is operated in a direction along the rotary axis X in connection with the setting of the protruding amount of the plunger 51. As a result, the operating oil is controlled by the spool 55, the relative rotational phase of the outer rotor 20 and the inner rotor 30 is set, and the control of the opening and closing timing of intake valves 5V is achieved.

The engine E and the variable valve timing control device A will hereunder be explained. The engine E (an example of the internal combustion engine) illustrated in FIG. 1 indicates an engine provided in a vehicle of, for example, an automobile. The engine E contains pistons 3 inside cylinder bores of cylinder blocks 2 arranged at an upper portion, and corresponds to a four-cycle-type engine in which connecting rods 4 connect the pistons 3 and the crankshaft 1. The engine E includes the intake camshaft 5 opening and closing the intake valves 5V, and an exhaust camshaft at the upper portion.

An engine configuration member 10 rotatably supporting the intake camshaft 5 includes a supply flow passage 8 supplying the operating oil from an oil hydraulic pump P driven by the engine E. The oil hydraulic pump P supplies lubricating oil accumulated in an oil pan of the engine E to the electromagnetic control valve V via the supply flow passage 8, the lubricating oil serving as the operating oil (an example of fluid).

A timing chain 7 is wound over an output sprocket 6, provided at the crankshaft 1 of the engine E, and a timing sprocket 22S of the outer rotor 20. Accordingly, the outer rotor 20 synchronously rotates with the crankshaft 1. A sprocket is also provided at a frond end of the exhaust camshaft provided at a discharge side, and is wound with the timing chain 7.

As illustrated in FIG. 2, the outer rotor 20 rotates in a drive rotary direction S by the drive force from the crankshaft 1. A direction in which the inner rotor 30 relatively rotates with the outer rotor 20 in the same direction as the drive rotary direction S is referred to as an advanced-angle direction Sa, and the opposite direction thereof is referred to as a retarded-angle direction Sb. In the variable valve timing control device A, a relationship between the crankshaft 1 and the intake camshaft 5 is set so as to enhance an intake compression ratio in response to an increase of a displacement amount when the relative rotational phase is displaced in an advanced-angle direction Sa, and so as to reduce the intake compression ratio in response to the increase of the displacement amount when the relative rotational phase is displaced in a retarded-angle direction Sb.

In the first embodiment, the variable valve timing control device A includes the intake camshaft 5. Alternatively, the variable valve timing control device A may include the exhaust camshaft or include both the intake camshaft 5 and the exhaust camshaft.

As illustrated in FIGS. 1 and 2, the outer rotor 20 includes an outer rotor main body 21, a front plate 22, and a rear plate 23 which are integrally fixed by plural fixing bolts 24. The timing sprocket 22S is provided at an outer circumference of the front plate 22. An annular member 9 is fitted in an inner circumference of the front plate 22. The annular member 9, an inner rotor main body 31, and the intake camshaft 5 are integrally provided by a bolt head portion 42 of the connecting bolt 40 that is press-fitted to the annular member 9.

The outer rotor 20 and the inner rotor 30 will hereunder be explained. As illustrated in FIG. 2, the outer rotor main body 21 is integrally provided with plural protrusions 21T protruding inwardly in a radial direction. The inner rotor 30 includes the columnar inner rotor main body 31 that is closely in contact with the protrusions 21T of the outer rotor main body 21, and, for example, four vane portions 32 protruding outwardly in the radial direction from the outer circumference of the inner rotor main body 31.

As such, the outer rotor 20 contains the inner rotor 30, and plural fluid pressure chambers C each is provided at the outer circumference of the inner rotor main body 31 at a middle position of the protrusions 21T disposed next to each other in a rotational direction (that is, the fluid pressure chamber C is sandwiched by the protrusions 21T disposed next to each other in the rotational direction), and the fluid pressure chambers C each is defined by the vane portion 32 to include an advanced-angle chamber Ca and a retarded-angle chamber Cb. Moreover, the inner rotor 30 is provided with advanced-angle passages 33 communicating with the advanced-angle chambers Ca, respectively, and retarded-angle passages 34 communicating with the retarded-angle chambers Cb, respectively.

As illustrated in FIGS. 1 and 2, a torsion spring 28 assisting a relative rotational phase (hereinafter referred to as a relative rotational phase) of the outer rotor 20 and the inner rotor 30 to displace in the advanced-angle direction Sa by acting biasing force of the torsion spring 28 from a most-retarded-angle phase in the advanced-angle direction Sa is provided over the outer rotor 20 and the annular member 9.

As illustrated in FIGS. 1 and 2, the variable valve timing control device A includes a lock mechanism L maintaining the relative rotational phase of the outer rotor 20 and the inner rotor 30 in the most-retarded-angle phase. The lock mechanism L includes a lock member 25, a lock spring 26, and a lock recessed portion 23a. The lock member 25 is supported so as to be extendable and retractable in the direction along the rotary axis X relative to the single vane portion 32. The lock spring 26 protrudingly biases the lock member 25. The lock recessed portion 23a is provided at the rear plate 23. Alternatively, the lock mechanism L may guide the lock member 25 so as to move along the radial direction.

The lock mechanism L comes to be in a lock state where the lock member 25 engages with the lock recessed portion 23a by the biasing force of the lock spring 26 when the relative rotational phase reaches the most-retarded-angle phase. The lock mechanism L is unlocked by the action of the pressure of the operating oil acting on the advanced-angle passage 33 to the lock member 25 in an unlock direction.

The connecting bolt 40 will hereunder be explained. As illustrated in FIGS. 3 to 6, the connecting bolt 40 is provided with the bolt head portion 42 at an outer end portion (left in FIG. 3) of a bolt main body 41 that is entirely formed in a cylindrical shape. The inner space 40R provided inside the connecting bolt 40 in the direction along the rotary axis X is provided, and a male screw portion 41S is provided at an outer circumference of an inner end portion (right in FIG. 3) of the bolt main body 41.

As illustrated in FIG. 1, the intake camshaft 5 is provided with a shaft inner space 5R about the rotary axis X, and a female screw portion 5S at an inner circumference of the shaft inner space 5R. The shaft inner space 5R communicates with the supply flow passage 8.

In this configuration, in a state where the bolt main body 41 is provided in the annular member 9, the outer rotor 20, and the inner rotor 30, the male screw portion 41S is threaded on the female screw portion 5S of the intake camshaft 5, and the inner rotor 30 is fixed to the intake camshaft 5 by the rotation of the bolt head portion 42. Accordingly, the annular member 9 and the inner rotor 30 are fixed to the intake camshaft 5, and the shaft inner space 5R and an inner space of the connecting bolt 40 communicate with each other.

A restriction wall 44 protruding in a direction approaching the rotary axis X is provided at an outer end side of the inner circumferential surface of the inner space 40R of the connecting bolt 40 in a direction along the rotary axis X. Plural (for example, four) drain grooves D each is provided along the rotary axis X in a region of the inner circumference of the connecting bolt 40 reaching a distal end from an intermediate position. Engagement recessed portions 44T are provided at parts of the restriction wall 44 overlapping the four drain grooves D.

The bolt main body 41 includes an advanced-angle port 41a communicating with the advanced-angle flow passage 33, and a retarded-angle port 41b communicating with the retarded-angle flow passage 34 from the outer circumferential surface of the bolt main body 41 over the inner space 40R. The restriction wall 44 restricts the position of a sleeve 53 by being in contact with an end portion of the outer end side of the sleeve 53 (left end portion in FIG. 3) and the position of a protruding side by being in contact with a land portion 55b of a spool 55.

The valve unit Vb will hereunder be explained. As illustrated in FIGS. 3 to 6, the inner space 40R of the connecting bolt 40 of the valve unit Vb includes the sleeve 53, a fluid supply pipe 54, and the spool 55. The sleeve 53 is fitted into the bolt main body 41 so as to be in closely contact with the inner circumferential surface thereof. The fluid supply pipe 54 is contained in the inner space 40R of the valve unit Vb so as to be coaxial with the rotary axis X. The spool 55 is disposed so as to be slidable in the direction along the rotary axis X in a state of being guided by the inner circumferential surface of the sleeve 53 and by the outer circumferential surface of a pipe passage portion 54T of the fluid supply pipe 54.

Moreover, the valve unit Vb includes a spool spring 56 serving as a biasing member biasing the spool 55 in a protruding direction thereof, a check valve CV, an oil filter 59, and a fixing ring 60. The check valve CV includes an opening plate 57 serving as a seat member and a valve plate 58 including a valve body 58a.

The sleeve 53 of the valve unit Vb will hereunder be explained. As illustrated in FIGS. 3 to 6, the sleeve 53 is formed in a cylindrical shape about the rotary axis X and is provided with plural (for example, two) engagement protrusions 53T protruding in a direction along the rotary axis X at the outer end side (left in FIG. 3). The sleeve 53 further includes an end portion wall 53W by a drawing process bending an inner end side (right in FIG. 3) to form an orientation orthogonal to the rotary axis X.

The restriction wall 44 is provided at an annular area and includes, for example, the four engagement recessed portions 44T by being cutout at parts corresponding to the drain grooves D.

The orientation of the sleeve 53 about the rotary axis X is set by the engagement of the engagement recessed portions 44T and the engagement protrusions 53T, respectively. Accordingly, drain holes 53c are maintained in a communicated state with the drain grooves D. The engagement recessed portions 44T and the engagement protrusions 53T provided at the sleeve 53 constitute engagement portions T, respectively, setting the orientation of the sleeve 53.

The sleeve 53 includes advanced-angle through holes 53a, retarded-angle through holes 53b, and the plural drain holes 53c that are formed in a quadrilateral hole shape. The advanced-angle hole 53a connects the advanced angle port 41a and inner space 40R. The retarded-angle hole 53b connects the retarded-angle port 41b and the inner space 40R. The plural drain holes 53c discharge the operating oil in the inner space 40R to the outer surface side of the sleeve 53.

The advanced-angle through holes 53a and the retarded-angle through holes 53b are provided in parallel to each other in the direction along the rotary axis X at four parts in the circumferential direction about the rotary axis X. The drain holes 53c are provided at four parts that are oriented differently from the advanced-angle through holes 53a and the retarded-angle through holes 53b in the circumferential direction about the rotary axis X.

The engagement protrusions 53T are disposed on an extended line in the direction along the rotary axis X based on two of the four drain holes 53c opposing one another by sandwiching the rotary axis X.

In the configuration, because the engagement protrusions 53T are engaged with the engagement recessed portions 44T of the restriction wall 44, respectively, and the restriction wall 44 is fitted with the sleeve 53 in a state of being in contact with the front end of the sleeve 53, the advanced-angle through hole 53a and the advanced-angle port 41a are maintained to communicate with each other, the retarded-angle through hole 53b and the retarded-angle port 41b are maintained to communicate with each other, and the drain hole 53b are maintained to communicate with the drain grooves D.

The fluid supply pipe 54 of the valve unit Vb will hereunder be explained. As illustrated in FIGS. 3 to 6, the fluid supply pipe 54 is integrally provided with a base end portion 54S that is fitted into the inner space 40R, and the pipe passage portion 54T that includes a diameter smaller than the base end portion 54S. Supply ports 54a are provided at an outer circumference of a distal end portion of the pipe passage portion 54T.

The base end portion 54S includes a fitting cylindrical portion 54Sa and a middle wall 54Sb. The fitting cylindrical portion 54Sa is disposed about the rotary axis X. The middle wall 54Sb is provided at an area from the fitting cylindrical portion 54Sa to the pipe passage portion 54T and is oriented orthogonal to the rotary axis X.

The three supply ports 54a provided at the outer circumference of the distal end portion of the pipe passage portion 54 is formed in a longitudinal hole shape extending along the rotary axis X. Four middle hole portions 55c provided at the spool 55 are formed in a circular shape. The number of the supply ports 54a and the number of the middle hole portions 55c provided at the spools 55 are different, and the opening width of each of the supply ports 54a in the circumferential direction is greater than the width of each of the intermediate portion of the supply ports 54a adjacent to each other in the circumferential direction (a part of the pipe passage portion 54T that is disposed in the middle of the supply ports 54a adjacent to each other), and therefore, the operating oil from the pipe passage portion 54T may be securely supplied to the middle hole portion 55c.

The spool 55 and the spool spring 56 of the valve unit Vb will hereunder be explained. As illustrated in FIGS. 3 to 6, the spool 55 includes a spool main body 55a, a pair of land portions 55b, and the plural (for example, four) intermediate hole portions 55c. The spool main body 55a is formed in a cylindrical shape and is provided with an operation end portion 55s at a distal end of the spool 55. The pair of land portions 55b is protrudingly provided at the outer circumference of the spool 55. The intermediate hole portions 55c connect an intermediate position of the pair of land portions 55b and inside of the spool 55.

The spool 55 includes a contact end portion 55r that sets an operation limit by coming in contact with the end portion wall 53W when the spool 55 is pushed in a direction opposite to the operation end portion 55s. The contact end portion 55r includes a diameter smaller than the land portion 55b at an end portion of an area to which the spool main body 55a extends.

The spool spring 56 is a compressed coil type and is disposed between the land portion 55b at an inner portion side of the spool 55 and the end portion wall 53W of the sleeve 53. The land portion 55b of the outer end side of the spool 55 comes in contact with the restriction wall 44 by the action of the biasing force, and the spool 55 is maintained in the advanced-angle position Pa shown in FIG. 3.

In addition, in the valve unit Vb, the positional relationship between the end portion wall 53W of the sleeve 53 and the middle wall 54Sb of the fluid supply pipe 54 is set so as to be in contact with each other. The end portion wall 53W and the middle wall 54Sb being in contact with each other are configured as a seal portion H preventing the flow of the operating oil by enhancing the precision of the flat surfaces thereof.

That is, in this configuration, because the position of the base end portion 54S of the fluid supply pipe 54 is fixed by the fixing ring 60, the base end portion 54S works as a retainer. Moreover, because the end portion wall 53W of the sleeve 53 is acted with the biasing force of the spool spring 56, the end portion wall 53W press-fits against the middle wall 54Sb of the base end portion 54S. Accordingly, by setting the orientations of the end portion wall 53W and the middle wall 54Sb so as to be closely in contact therewith, the end portion wall 53W closely comes in contact with the middle wall 54Sb by using the biasing force of the spool spring 56 to configure the part as the seal portion H.

Figure 6:
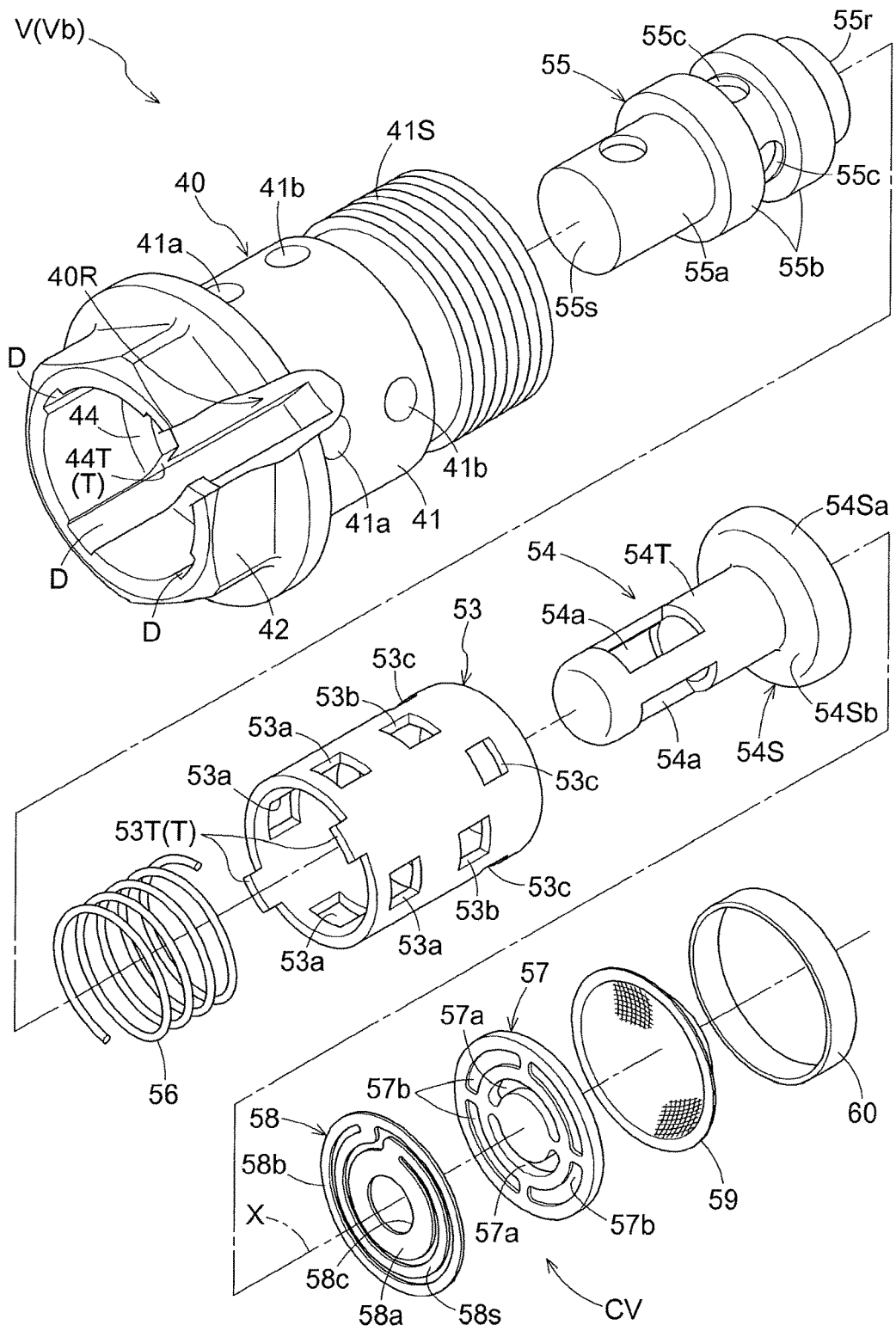
FIG. 6 is an exploded perspective view of the valve unit.
Figure 7:
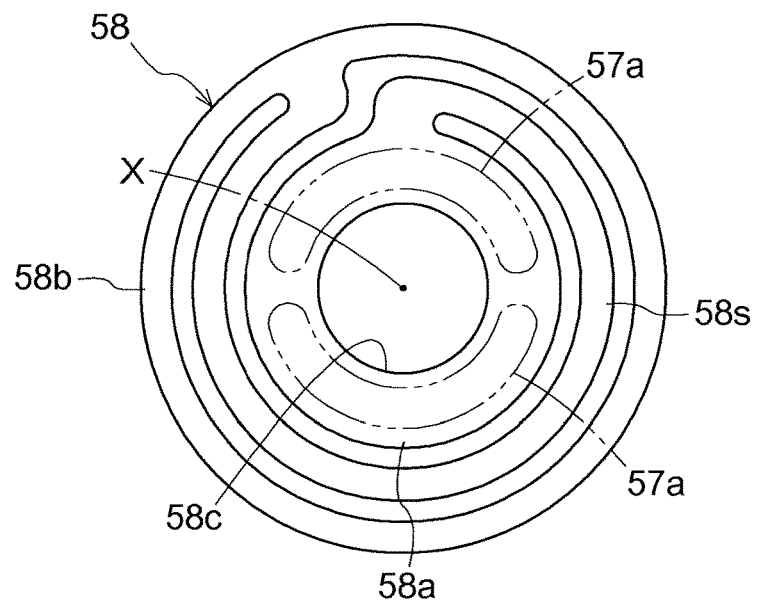
FIG. 7 is a front view of a valve plate.

The check valve CV will hereunder be explained. As illustrated in FIGS. 6 and 7, the opening plate 57 and the valve plate 58 constituting the check valve CV are made from a metal plate including the same outer diameter. The opening plate 57 is disposed at an upstream in a supplying direction of the operating oil. The valve plate 58 is disposed at a position being in contact with the opening plate 57 at a downstream. Specifically, the valve plate 58 is made from a spring plate member.

The opening plate 57 includes a pair of circulation ports 57a that is disposed at an annular area about the rotary axis X and that is formed in an arc-shape symmetric about the rotary axis X. The opening plate 57 includes plural groove portions 57b being formed in an arc- shape about the rotary axis X at an area surrounding the circulation port 57a at a surface of the opening plate 57 facing the valve plate 58.

The valve plate 58 includes the circular valve body 58a, an annular portion 58b, and a curled spring portion 58s which are integrally formed. The valve body 58a is disposed about the rotary axis X at a center position of the valve plate 58. The annular portion 58b is disposed about the rotary axis X at the outer circumference of the valve plate 58. The curled spring portion 58s is disposed so as to connect the valve body 58a and the annular portion 58b. The valve body 58a includes a diameter larger than that of the annular area where the circulation port 57a is provided, and includes an opening portion 58c including a diameter smaller than the annular area.

Figure 5:
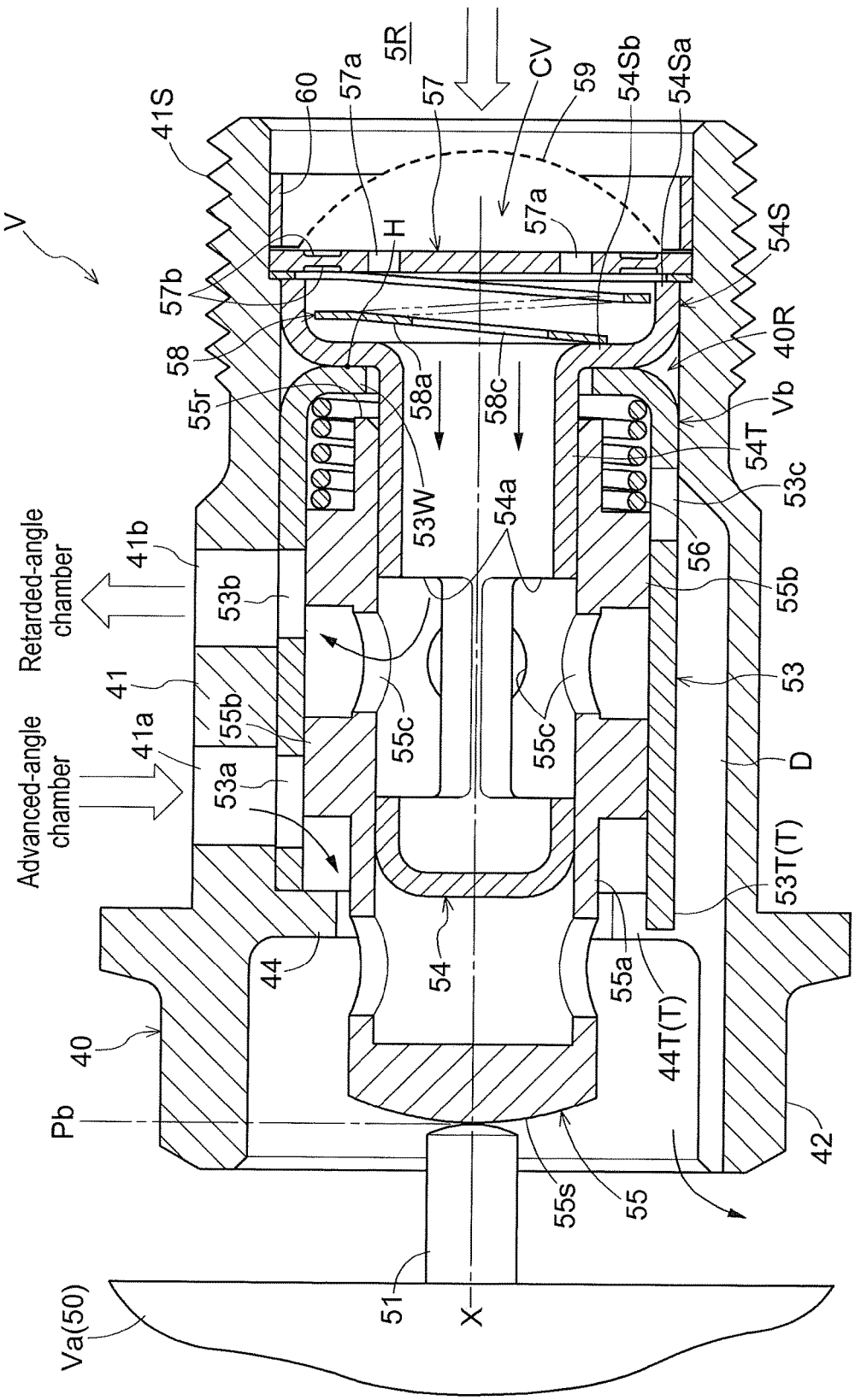
FIG. 5 is a cross sectional view of the valve unit in which the spool is disposed in a retarded-angle position.

In this configuration, in a case where the check valve CV is assembled, the optimal positional relationship is provided by only fitting the valve plate 58 and the opening plate 57 to the inner space 40R of the connecting bolt 40, and therefore, the positioning operation, for example, is not required. Furthermore, in a case where the operating oil is supplied to the check valve CV, the spring portion 58s is elastically deformed as illustrated in FIGS. 3 and 5, and therefore, the operating oil may be circulated by the separation of the valve body 58a from the circulation port 57a.

Figure 4:
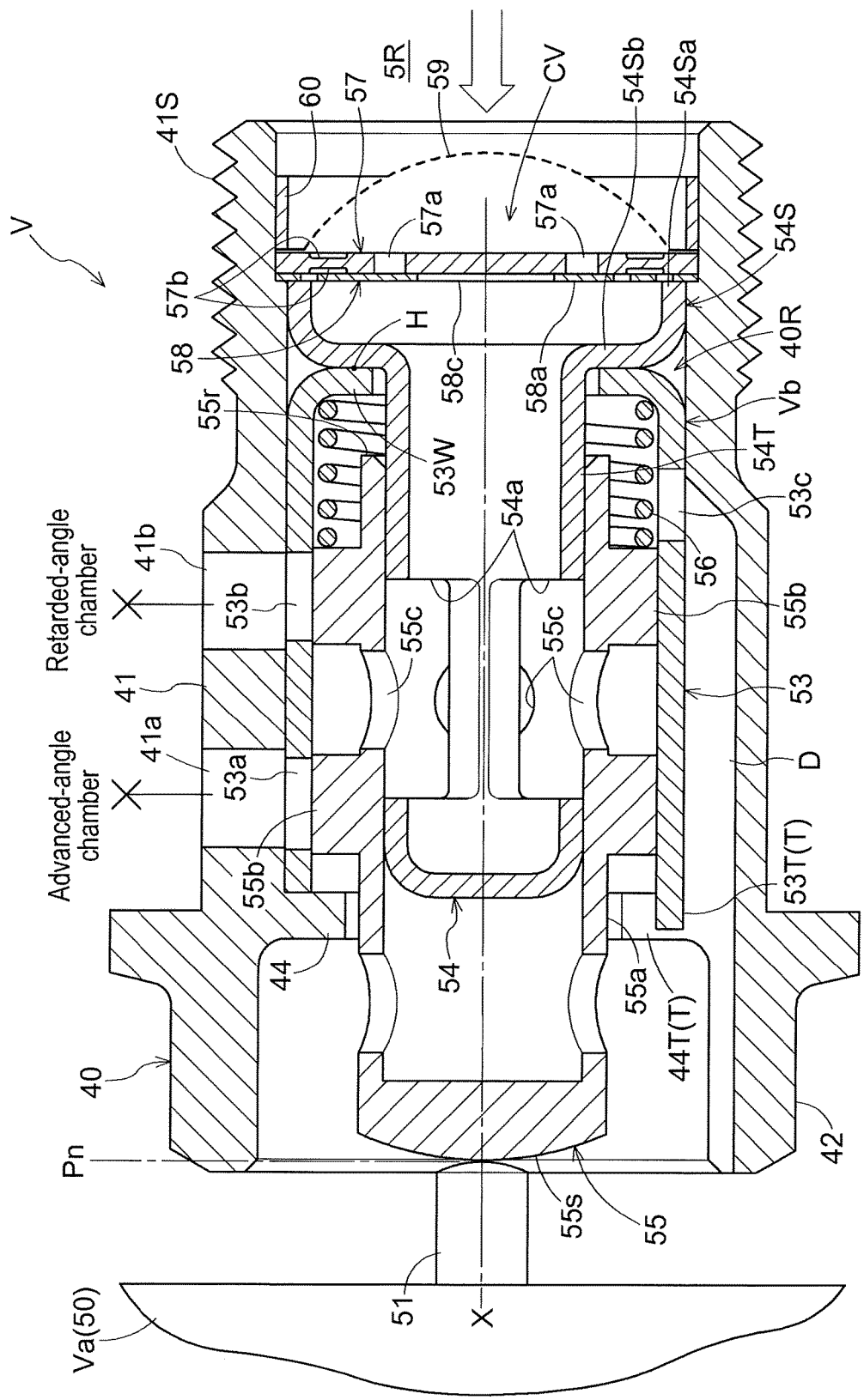
FIG. 4 is a cross sectional view of the valve unit in which the spool is disposed in a neutral position.

In the check valve CV, in a case where the pressure level at the downstream side increases, in a case where the discharging pressure level of the oil hydraulic pump P decreases, or in a case where the spool 55 is set at a neutral position Pn, the valve body 58a closes the circulation port 57a of the opening plate 57 by being in close contact therewith by the biasing force of the spring portion 58s as illustrated in FIG. 4. Specifically, when the valve body 58a closes the circulation port 57a, the groove portion 57b of the opening plate 57 prevents the spring portion 58s from closely coming in contact with and from not separating from the opening plate 57.

Furthermore, the oil filter 59 is provided with a filter portion including a net member having an outer diameter that is the same as that of the opening plate 57 and the valve plate 58 and that includes a center portion expanding to the upstream in the supplying direction of the operating oil. The fixing ring 60 is press-fixed to the inner circumference of the connecting bolt 40, and the fixing ring 60 defines the positions of the oil filter 59, the opening plate 57, and the valve plate 58.

The check valve CV may be minimized by including this configuration. As illustrated in FIG. 3, when the check valve CV is in an open state, the operating oil flowing in the pair of circulation ports 57*a* provided at the opening plate 57 may pass through the opening portion 58*c* of the valve body 58*a*. Accordingly, by the flow of the operating oil along the rotary axis X at the position in the vicinity of the rotary axis X that is ahead of the opening portion 58*c*, for example, the operating oil may be supplied in a state of being prevented from losing the pressure by inhibiting the inconvenience of, for example, the pressure loss due to the contact of the operating oil to the inner wall of the pipe passage portion 54T of the fluid supply pipe 54.

The pair of circulation ports 57*a* that is symmetric about the rotary axis X is provided at the opening plate 57, thereby securely opening the valve body 58*a* by acting the balanced pressure to the valve body 58*a*, and sending the operating oil passing through the pair of circulation ports 57*a* to the opening portion 58*c*.

Specifically, because the check valve CV is contained in the inner space 40R of the connecting bolt 40, for example, comparing to the configuration in which the check valve CV is disposed outside of the connecting bolt 40, the configuration of the flow passage may be simply structured, and the responsiveness of the check valve CV may be enhanced by the disposition of the check valve CV in the vicinity of the flow passage communicating with the advanced-angle chambers Ca and the retarded-angle chambers Cb.

The control mode of the operating oil will hereunder be explained. In the variable valve timing control device A, when the solenoid portion 50 of the electromagnetic unit Va is not supplied with the electricity, the pressing force is not applied to the spool 55 from the plunger 51, and as illustrated in FIG. 3, the spool 55 is maintained at a position where the land portion 55*b* disposed at the outer end side the spool 55 is in contact with the restriction wall 44 by the biasing force of the spool spring 56.

The spool 55 is disposed at the advanced-angle position Pa, and the middle hole portions 55*c* of the spool 55 communicate with the advanced-angle communication holes 53*a* by the positional relationship between the pair of land portions 55*b* and the set of the advanced-angle through holes 53*a* and the retarded-angle through holes 53*b*, and the retarded-angle through holes 53*b* communicate with inside the sleeve 53 (the inner space 40R).

Accordingly, the operating oil supplied from the oil hydraulic pump P is supplied to the advanced-angle chambers Ca via the middle hole portions 55*c* of the spool 55, the advanced-angle through holes 53*a*, and the advanced-angle ports 41*a* from the supply ports 54*a* of the fluid supply pipe 54.

At the same time, the operating oil of the retarded-angle chambers Cb flows to the drain holes 53*c* via the retarded-angle ports 41*b* and the retarded-angle through holes 53*b*, and is discharged outside from the end portion of the head portion side of the connecting bolt 40 via the drain grooves D. As a result of the supply and discharge of the operation oil, the relative rotational phase is displaced in the advanced-angle direction Sa.

Specifically, when the lock mechanism L is in a locked state, the operating oil is supplied by the setting of the spool 55 to the advanced-angle position Pa, the part of the operation oil supplied to the advanced-angle chambers Ca is supplied to the lock mechanism L from the advanced-angle flow passages 33, and the lock member 25 is released from the lock recessed portion 23*a* to achieve the unlock operation.

By the supply of the predetermined amount of the electricity to the solenoid portion 50 of the electromagnetic unit Va, the plunger 51 protrudes, and spool 55 may be set at a neutral position Pn shown in FIG. 4 against the biasing force of the spool spring 56.

When the spool 55 is set at the neutral position Pn, the pair of land portions 55*b* is disposed at a position closing the advanced angle through holes 53*a* and the retarded-angle through holes 53*b* of the sleeve 53. Accordingly, the relative rotational phase of the outer rotor 20 and the inner rotor 30 is maintained without supplying and discharging the operating oil to the advanced-angle chambers Ca and the retarded-angle chambers Cb.

By the supply of the electricity that is greater than the predetermined amount of the electricity to the solenoid portion 50 of the electromagnetic unit Va, the plunger 51 further protrudes and the spool 55 may be set at the retarded-angle position Pb shown in FIG. 5.

In the retarded-angle position Pb, the middle hole portions 55*c* of the spool 55 and the retarded-angle through holes 53*b* communicate with each other by the positional relationship between the pair of land portions 55*b* and the set of the advanced-angle through holes 53*b* and the retarded-angle through holes 53*b*. Accordingly, the advanced-angle through holes 53*a* communicate with an outer space via the inner circumference of the restriction wall 44.

Accordingly, the operating oil supplied from the oil hydraulic pump P is supplied to the retarded-angle chambers Cb via the middle hole portions 55*c* of the spool 55, the retarded-angle through holes 53*b*, and the retarded-angle ports 41*b* from the supply ports 54*a* of the fluid supply pipe 54.

At the same time, the operating oil of the advanced-angle chambers Ca flows from the advanced-angle ports 41*a* to the outer circumference of the spool main body 55*a* via the advanced-angle through holes 53*a* and a clearance between the outer circumference of the spool main body 55*a* and the inner circumference of the restriction wall 44, and discharges to the outside from the head portion side of the connecting bolt 40. As a result of the supply and discharge of the operating oil, the relative rotational phase of the outer rotor 20 and the inner rotor 30 is displaced in the retarded-angle direction Sb.

A second embodiment will hereunder be explained. The disclosure may configure as below other than the aforementioned first embodiment. Components having the same function described in the first embodiment are marked with the same reference numerals.

Figure 8:
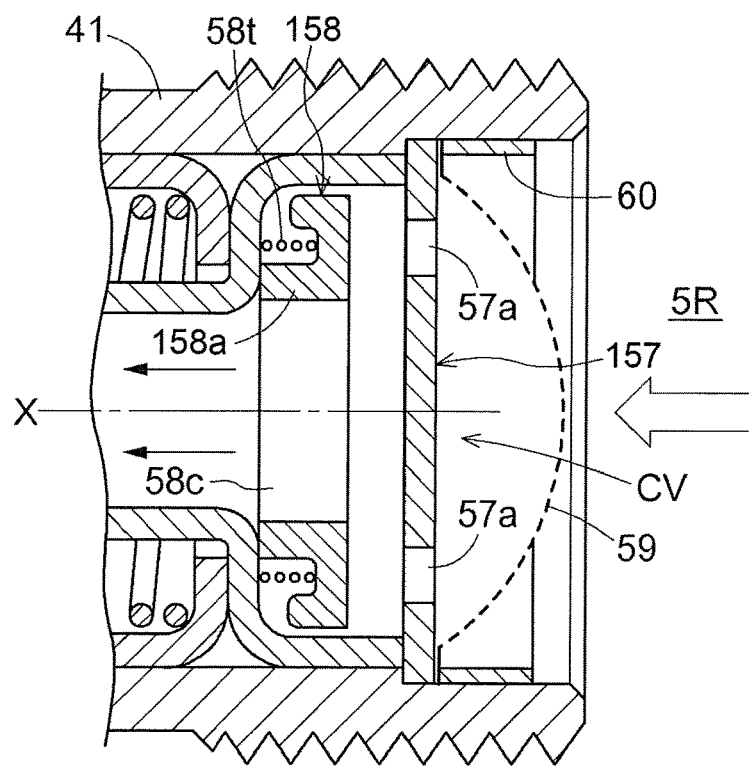
FIG. 8 is a cross sectional view of a check valve according to a second embodiment.
Figure 9:
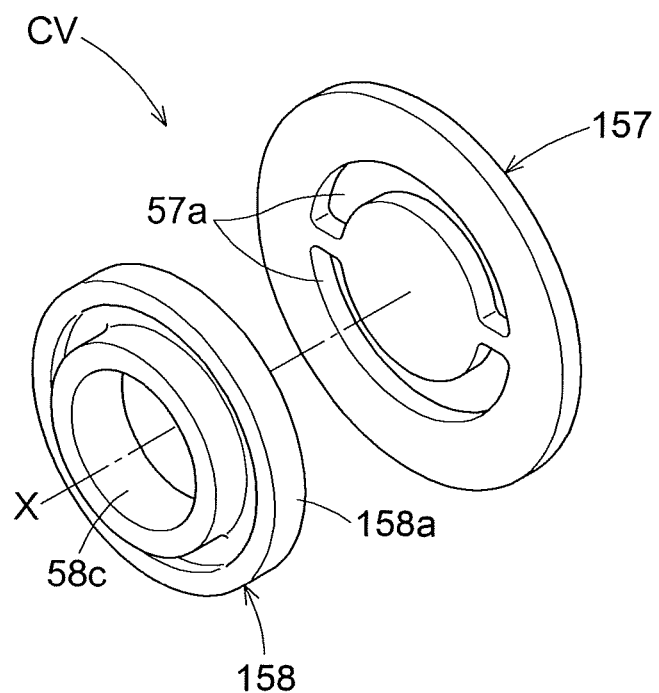
FIG. 9 is an exploded perspective view of the check valve according to the second embodiment.

As illustrated in FIGS. 8 and 9, the check valve CV includes an opening plate 157 serving as a seat member having the circulation ports 57*a*, a valve plate 158 including an annular valve body 158*a*, and a compression-coil-type closing spring 58*t* biasing the valve body 158*a* in a direction coming in contact with the opening plate 157.

In the configuration of the second embodiment, the valve body 158*a* is away from the opening plate 157 against the biasing force of the closing spring 58*t* in a state where the pressure of the operating oil is applied from the oil hydraulic pump P, and discharges the operating oil passing through the circulation ports 57*a* from the opening portion 58*c* of the valve body 158*a*. In addition, in a state where the pressure of the downstream side increases, or in a state where the discharging pressure of the oil hydraulic pump P decreases, the valve body 158*a* comes in contact with the opening plate 157 by the biasing force of the closing spring 58*t*, and prevents the operating oil from flowing by closing the circulation ports 57*a*.

Figure 10:
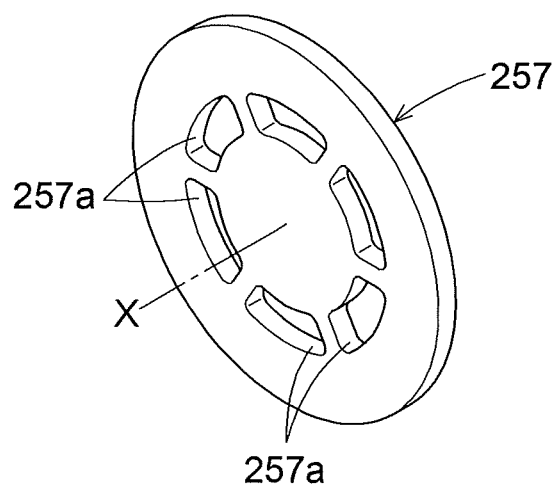
FIG. 10 is a perspective view of an opening portion according to a third embodiment.

A third embodiment will hereunder be explained, As illustrated in FIG. 10, the check valve CV is configured with, for example, more than three circulation ports 257a at an opening plate 257. Six circulation ports 257a are shown in FIG. 10. Alternatively, the number of the circulation port 57a may be more than three.

In the third embodiment, the valve plate 58 includes the valve body 58a as described in the first embodiment. Alternatively, as shown in the second embodiment, the check valve CV may include the valve body 158a being biased by the closing spring 58t in the closing direction.

Figure 11:
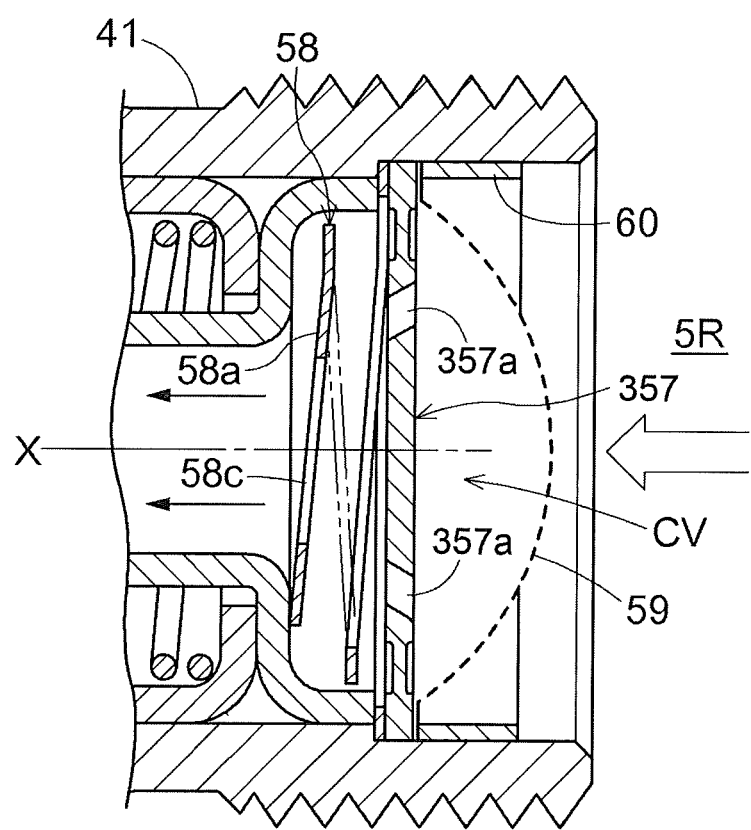
FIG. 11 is a cross sectional view of a check valve of the third embodiment.

A fourth embodiment will hereunder be explained. As illustrated in FIG. 11, opening rims of circulation ports 357a are set to incline, or tilt relative to the rotary axis X to guide the operating oil flowing in the circulation ports 357a in a center direction of the opening portion 58c of the valve body 58a.

In the fourth embodiment, the valve plate 58 includes the valve body 58a. Alternatively, as illustrated in the second embodiment, the check valve CV may be configured with the valve body 158a being biased in the closing direction by the closing spring 58t.

Regarding industrial applicability, the disclosure can be used for a variable valve timing control apparatus that includes a valve unit and a check valve being coaxial with a rotary axis.

According to the aforementioned first and second embodiments, the variable valve timing control device (A) includes the drive-side rotational body (20) rotating synchronously with the crankshaft (1) of the internal combustion engine (E), the driven-side rotational body (30) being coaxially disposed with the rotary axis (X) of the drive-side rotational body (20) and rotating integrally with the camshaft (5) for opening and closing the valve, the connecting bolt (40) being coaxially disposed with the rotary axis (X) and connecting the driven-side rotational body (30) to the camshaft (5), the connecting bolt (40) being formed with the advanced-angle port (41a) and the retarded-angle port (41b) from the outer circumferential surface of the connecting bolt (40) through an inner space (40R), the advanced-angle port (41a) and the retarded-angle port (41b) communicating with the advanced-angle chamber (Ca) and the retarded-angle chamber (Cb), respectively, that are disposed between the drive-side rotational body (20) and the driven-side rotational body (30), the valve unit (Vb) being disposed at the inner space (40R) of the connecting bolt (40), and the check valve (CV) being provided at the upstream in the supplying direction of fluid relative to the valve unit (Vb). The check valve (CV) includes the seat member (57) being formed with at least one circulation port (57a) at the position being away from the rotary axis(X), and the valve body (58a) being configured to close the circulation port (57a) at the downstream in the supplying direction of the fluid relative to the seat member (57), the valve body (58a) including the opening portion (58c) about the rotary axis (X).

According to the characteristic configuration, because the valve body 58a includes the opening portion 58c about the rotary axis X, the fluid from the circulation port 57a may be sent to the opening portion 58c of the valve body 58a in a state where the valve body 58a is away from the opening plate 57. Accordingly, when the fluid circulates in the opening portion 58c of the valve body 58a, the fluid flows at or in the vicinity of the rotary axis X, and therefore, the pressure loss of the fluid at a supply path may be inhibited. Thus, the variable valve timing control device A may inhibit the fluid supplied to the valve unit Vb from losing the pressure while having the configuration in which the valve unit Vb and the check valve CV are provided along the rotary axis X.

According to the aforementioned first and second embodiments, the valve body (58a) is formed in the circular shape about the rotary axis (X), the valve body (58a) is surrounded by the annular portion (58b) that is about the rotary axis (X), and the valve body (58a) and the annular portion (58b) are connected with each other by the spring portion (58s).

Accordingly, because of being provided at a center of the position surrounded by the circular annular portion 58b about the rotary axis X, and being formed in a circular shape about the rotary axis X, the valve body 58a may be coaxially disposed with the rotary axis X regardless of the orientation of the annular portion 58b. Accordingly, it doesn't take much time to assemble the check valve CV According to the aforementioned first and second embodiments, the seat member (57) is formed with the plurality of circulation ports (57a).

Accordingly, because the opening plate 57 includes the plural circulation ports 57a, the flow amount of the fluid when the valve body 58a opens may be secured without decreasing the strength of the opening plate 57. According to the aforementioned first and second embodiments, the check valve (CV) is housed in the inner space (40R) of the connecting bolt (40).

Accordingly, for example, comparing to the check valve CV being disposed outside the connecting bolt 40, the configuration of the flow passage of the fluid may be simplified. In addition, because the check valve CV is disposed in the vicinity of the flow passage communicating with either the advanced-angle chambers Ca or the retarded-angle chambers Cb, the valve body 58a may be closed with the great responsiveness in a case where the pressure level of either the advanced-angle chambers Ca or the retarded-angle chambers Cb increases.

According to the aforementioned first and second embodiments, the annular portion (58b) surrounding the valve body (58a), the valve body (58a), and the spring portion (58s) connecting the annular portion (58b) and the valve body (58a) are integrally formed to constitute the valve plate (58), and the check valve (CV) is configured such that the valve plate (58) is disposed adjacent to the seat member (57).

Accordingly, for example, the annular portion 58b, the valve body 58a and the spring portion 58s are integrally formed by the pressing of the plate material, and therefore, the check valve CV may be provided with a low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A variable valve timing control device, comprising:
a drive-side rotational body rotating synchronously with a crankshaft of an internal combustion engine;
a driven-side rotational body being coaxially disposed with a rotary axis of the drive-side rotational body and rotating integrally with a camshaft for opening and closing a valve;
a connecting bolt being coaxially disposed with the rotary axis and connecting the driven-side rotational body to the camshaft, the connecting bolt being formed with an advanced-angle port and a retarded-angle port from an outer circumferential surface of the connecting bolt through an inner space, the advanced-angle port and the retarded-angle port communicating with an advanced-angle chamber and a retarded-angle chamber, respectively, that are disposed between the drive-side rotational body and the driven-side rotational body;

a valve unit being disposed at the inner space of the connecting bolt; and a check valve being provided at an upstream in a supplying direction of fluid relative to the valve unit, wherein the check valve includes a seat member being formed with at least one circulation port at a position being away from the rotary axis; and a valve plate being configured to close the circulation port at a downstream in the supplying direction of the fluid relative to the seat member, the valve plate including an opening portion about the rotary axis, wherein the seat member includes a groove portion formed at a surface of the seat member which faces the valve plate, the valve plate includes a valve body formed in a circular shape about the rotary axis, the valve body is surrounded by an annular portion that is about the rotary axis, and the valve body and the annular portion are connected with each other by a spring portion.

2. The variable valve timing control device according to claim 1, wherein the seat member is formed with a plurality of circulation ports.

3. The variable valve timing control device according to claim 1, wherein the check valve is housed in the inner space of the connecting bolt.

4. The variable valve timing control device according to claim 2, wherein the check valve is housed in the inner space of the connecting bolt.

5. The variable valve timing control device according to claim 1, wherein the annular portion surrounding the valve body, the valve body, and the spring portion connecting the annular portion and the valve body are integrally formed to constitute the valve plate; and the check valve is configured such that the valve plate is disposed adjacent to the seat member.

6. The variable valve timing control device according to claim 2, wherein the annular portion surrounding the valve body, the valve body, and the spring portion connecting the annular portion and the valve body are integrally formed to constitute the valve plate; and the check valve is configured such that the valve plate is disposed adjacent to the seat member.

7. The variable valve timing control device according to claim 3, wherein the annular portion surrounding the valve body, the valve body, and the spring portion connecting the annular portion and the valve body are integrally formed to constitute the valve plate; and the check valve is configured such that the valve plate is disposed adjacent to the seat member.

8. A variable valve timing control device, comprising:

a drive-side rotational body configured to rotate synchronously with a crankshaft of an internal combustion engine;

a driven-side rotational body coaxially disposed with a rotary axis of the drive-side rotational body and configured to rotate integrally with a camshaft for opening and closing a valve;

a connecting bolt coaxially disposed with the rotary axis and connecting the driven-side rotational body to the camshaft, the connecting bolt possessing an advanced-angle port and a retarded-angle port from an outer circumferential surface of the connecting bolt through an inner space, the advanced-angle port and the retarded-angle port communicating with an advanced-angle chamber and a retarded-angle chamber, respectively, that are disposed between the drive-side rotational body and the driven-side rotational body;

a valve unit being disposed at the inner space of the connecting bolt; and a check valve upstream in a supplying direction of fluid relative to the valve unit, wherein the check valve includes a seat member possessing at least one circulation port which does not intersect with the rotary axis; and a valve plate configured to close the circulation port downstream in the supplying direction of the fluid relative to the seat member, the valve plate including a valve body configured to cover the at least one circulation port, the valve body possessing an opening portion which intersects with the rotary axis, wherein the seat member includes a groove portion formed at a surface of the seat member which faces the valve plate.

9. The variable valve timing control device according to claim 8, wherein the valve plate further includes an annular portion which surrounds the valve body, and a spring portion which connects the valve body and the annular portion.

* * * * *